US012763035B1

(12) United States Patent
Carlsson et al.

(10) Patent No.: US 12,763,035 B1
(45) Date of Patent: Oct. 13, 2026

(54) MANAGING AUGMENTED-REALITY GRAPHICAL ELEMENTS UNDER POWER CONSTRAINTS

(71) Applicant: Distance Technologies Oy, Helsinki (FI)

(72) Inventors: Thomas Carlsson, Vantaa (FI); Harri Kapanen, Espoo (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/345,948

(22) Filed: Sep. 30, 2025

(51) Int. Cl.
*G09G 3/20* (2006.01)
*G09G 3/34* (2006.01)

(52) U.S. Cl.
CPC ....... *G09G 3/34* (2013.01); *G09G 2320/0626* (2013.01); *G09G 2330/023* (2013.01); *G09G 2340/0435* (2013.01)

(58) Field of Classification Search
CPC ............. G09G 3/34; G09G 2320/0626; G09G 2330/023; G09G 2340/0435
See application file for complete search history.

(56) References Cited

U.S. PATENT DOCUMENTS 6,370,516 B1 * 4/2002 Reese .................... G06Q 40/00 705/36 R
6,654,024 B1 * 11/2003 Volkel .................... B60K 35/22 345/589
7,518,621 B2 * 4/2009 Kinoshita ............ G09G 3/2096 345/694
8,264,499 B1 * 9/2012 Landry .............. H04N 21/4312 715/275
8,872,753 B2 * 10/2014 Glen ......................... G09G 5/10 345/102
9,709,805 B2 * 7/2017 Weindorf ................. B60Q 3/80
10,319,116 B1 * 6/2019 C .......................... G06F 3/0482
10,878,540 B1 * 12/2020 Stevens ................... G06T 11/40
11,580,933 B1 * 2/2023 Tarabay ................... G09G 5/10
12,067,909 B2 * 8/2024 Pieri ..................... G02B 27/017
2007/0030222 A1 * 2/2007 Lee ...................... G09G 3/3406 345/87
2007/0168122 A1 * 7/2007 Aspen .................. G01C 23/005 701/3

(Continued)

*Primary Examiner* — Jose R Soto Lopez
(74) *Attorney, Agent, or Firm* — Ziegler IP Law Group, LLC.

(57) ABSTRACT

A system includes a display having a plurality of zones whose luminance is individually controllable, and at least one processor. The at least one processor is configured to identify graphical elements to be presented, determine for each graphical element an importance level and a corresponding set of zones within the display, determine for each zone minimum and maximum luminance levels based on at least one graphical element and its importance level, estimate for each zone minimum and maximum power consumption values based on respective luminance levels, calculate a maximum total power consumption value, determine whether the maximum total power consumption value exceeds a current power budget, and when it does, adjust luminance levels of zones corresponding to graphical elements having a lowest importance level until a first adjusted total power consumption value does not exceed the current power budget.

15 Claims, 7 Drawing Sheets

(56) References Cited

U.S. PATENT DOCUMENTS

2008/0036753 A1* 2/2008 Washio ................ G09G 3/3688 345/212
2008/0231581 A1* 9/2008 Fujine .................. G09G 3/3406 345/98
2009/0284545 A1* 11/2009 Watanabe ............ G09G 3/3406 345/589
2010/0103186 A1* 4/2010 Luengen ................... G06F 3/14 345/589
2010/0302133 A1* 12/2010 Liang ................... G09G 3/3426 345/102
2011/0208389 A1* 8/2011 Tarte ...................... B60K 35/10 715/764
2012/0299891 A1* 11/2012 Fujiwara .............. G09G 3/3426 345/212
2013/0227495 A1* 8/2013 Rydenhag ........... G06F 3/04883 715/863
2013/0268876 A1* 10/2013 Cho .................... G06F 3/04845 715/769
2013/0304963 A1* 11/2013 Luo ....................... G06F 1/3275 711/102
2014/0037200 A1* 2/2014 Phillips ..................... G06T 7/90 382/162
2014/0320479 A1* 10/2014 Kaneko ............... G02F 1/13306 345/212
2015/0234561 A1* 8/2015 Kashima ............... G06F 3/0481 715/784
2015/0356905 A1* 12/2015 Watanabe ............ G09G 3/3648 345/88
2016/0314762 A1* 10/2016 Lee ........................ G09G 3/001
2017/0017451 A1* 1/2017 Sathyanarayana Raghu ............... G06F 3/1454
2017/0309216 A1* 10/2017 Jiao .......................... G09G 5/10
2019/0311672 A1* 10/2019 Jeong ....................... G09G 3/32
2019/0378475 A1* 12/2019 Lim ....................... B60K 35/10
2020/0026776 A1* 1/2020 Boss ................. G06F 16/24578
2020/0118316 A1* 4/2020 Kim ........................ G06T 11/60
2020/0302868 A1* 9/2020 Kim ..................... G09G 3/3233
2020/0380909 A1* 12/2020 Matoba .................... G09G 3/32
2022/0230575 A1* 7/2022 Chung ................. G09G 3/3208
2022/0284844 A1* 9/2022 Zhang ..................... G06F 9/451
2022/0303381 A1* 9/2022 Phillips .............. G06Q 30/0635
2022/0383789 A1* 12/2022 Ahn ......................... G09G 3/20
2023/0247129 A1* 8/2023 Baek ................... H04M 1/0235 455/575.4
2024/0038181 A1* 2/2024 Noami ..................... G09G 3/36
2024/0094964 A1* 3/2024 Saeda ................... G06F 3/1255
2024/0169865 A1* 5/2024 Andersson Lonnstrom ................ G09F 13/20
2024/0194124 A1* 6/2024 Ogawa ..................... G09G 3/20
2024/0353922 A1* 10/2024 Dedonato ............... G06F 3/013
2024/0386854 A1* 11/2024 Chen .................... B60K 35/215
2024/0406334 A1* 12/2024 Cao ...................... G09G 3/2003
2025/0069563 A1* 2/2025 Shimoshikiryoh .. G09G 3/3688
2025/0131891 A1* 4/2025 Sato ......................... G09G 3/36
2025/0139936 A1* 5/2025 Merchant .................. G06T 3/40
2025/0174168 A1* 5/2025 Hayden ..................... G06T 5/94
2025/0181205 A1* 6/2025 Lee ......................... G06F 9/451
2025/0209956 A1* 6/2025 Chien ...................... G09G 3/20
2025/0232702 A1* 7/2025 Weindorf ............... B60K 35/22
2025/0316202 A1* 10/2025 Wu ...................... G09G 3/2007
2025/0329298 A1* 10/2025 Shin ......................... G09G 3/20
2025/0372041 A1* 12/2025 Lee ...................... G09G 3/3233
2025/0377778 A1* 12/2025 Gitter ...................... G06F 3/013

* cited by examiner

MANAGING AUGMENTED-REALITY GRAPHICAL ELEMENTS UNDER POWER CONSTRAINTS

TECHNICAL FIELD

The present disclosure relates to systems for managing graphical elements presented by displays under power constraints. The present disclosure also relates to methods for managing graphical elements presented by displays under power constraints.

BACKGROUND

Display systems are commonly utilised in automotive and augmented reality systems to provide visual information overlays within a user's field of view while allowing continuous observation of a surrounding environment. In many vehicular applications, HUD systems are implemented to project driving-related information onto a windshield so that a driver can access critical data without shifting gaze away from a roadway. Such systems are designed to enhance situational awareness by visually integrating navigation, safety warnings, or operational statuses directly into the driver's line of sight.

In conventional vehicular implementations, display systems are subject to constraints arising from electrical power budgets and thermal limitations inherent in vehicle designs. Power budgets are defined to ensure that all vehicular subsystems operate within an allocated energy envelope, thereby preserving overall electrical efficiency and preventing overloading of a power supply infrastructure of the vehicle. For example, certain vehicle manufacturers specify that any peripheral subsystem consuming beyond a defined power threshold, such as 40 watts, is categorised as imposing an excessive load on an electrical system of the vehicle, potentially affecting energy availability for other critical vehicular functions.

To overcome the aforesaid power thresholds imposed by vehicle manufacturers, conventional display systems employ general power optimisation approaches that reduce global brightness or deactivate a display of the vehicle under low power availability or elevated thermal conditions. However, such systems typically do not implement fine-grain adjustments that consider individual graphical elements, their visual importance, or strategic placement within a display area to minimise power consumption. The absence of detailed control over how and where graphical content is presented often results in complete shutdowns of display systems under constrained conditions, limiting the availability of essential visual information to the user.

Therefore, a need exists for display systems that can maintain operational availability and visual clarity under dynamic power and thermal constraints. Such systems are required to address limitations of conventional global power management approaches and to preserve critical display functionality without relying solely on broad brightness reductions or display deactivation.

SUMMARY

The present disclosure seeks to provide a system comprising a display with a plurality of zones whose luminance is individually controllable, and at least one processor configured to manage graphical elements based on importance levels and power consumption values to ensure a total power consumption does not exceed a current power budget. The present disclosure also seeks to provide a method comprising identifying graphical elements, determining importance levels and corresponding zones, estimating power consumption values based on luminance levels, calculating a total power consumption value, and adjusting luminance levels of zones corresponding to graphical elements having a lowest importance level until the total power consumption does not exceed a current power budget, wherein the display comprises a plurality of zones whose luminance is individually controllable. The aim of the present disclosure is achieved by the system and the method as defined in the appended independent claims to which reference is made. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
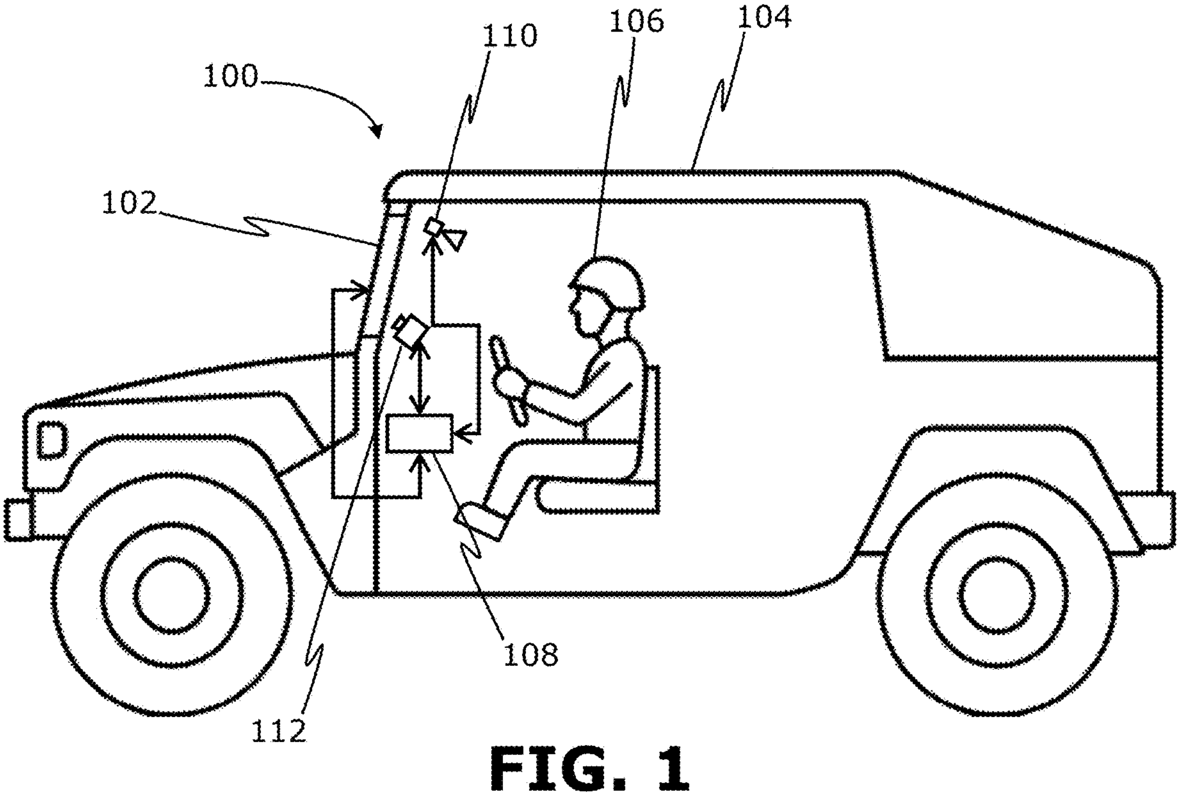
FIG. 1 illustrates an exemplary implementation of a system, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a system comprising:

- a display comprising a plurality of zones whose luminance is individually controllable; and
- at least one processor configured to:
  - identify a plurality of graphical elements to be presented in a sequence of images;
  - for each graphical element, determine a corresponding importance level;

for each graphical element, determine a corresponding set of zones within the display that are to be used to present said graphical element;

for each zone, determine a minimum luminance level and a maximum luminance level, based on at least one graphical element to be presented by said zone, and an importance level of the at least one graphical element;

for each zone, estimate a minimum power consumption value and a maximum power consumption value, based on a respective minimum luminance level and a respective maximum luminance level;

calculate a maximum total power consumption value for the display, by summing maximum power consumption values of the plurality of zones;

determine whether the maximum total power consumption value exceeds a current power budget of the display; and when it is determined that the maximum total power consumption value exceeds the current power budget, identify first zones that correspond to at least one graphical element having a lowest importance level; and adjust luminance levels of the first zones to lie between respective minimum luminance levels and respective maximum luminance levels, until a first adjusted total power consumption value of the display does not exceed the current power budget.

In a second aspect, the present disclosure provides a method comprising: identifying a plurality of graphical elements to be presented in a sequence of images;

for each graphical element, determining a corresponding importance level;

for each graphical element, determining a corresponding set of zones within a display that are to be used to present said graphical element, wherein the display comprises a plurality of zones whose luminance is individually controllable;

for each zone, determining a minimum luminance level and a maximum luminance level, based on at least one graphical element to be presented by said zone, and an importance level of the at least one graphical element;

for each zone, estimating a minimum power consumption value and a maximum power consumption value, based on a respective minimum luminance level and a respective maximum luminance level;

calculating a maximum total power consumption value for the display, by summing maximum power consumption values of the plurality of zones;

determining whether the maximum total power consumption value exceeds a current power budget of the display; and when it is determined that the maximum total power consumption value exceeds the current power budget, identifying first zones that correspond to at least one graphical element having a lowest importance level; and adjusting luminance levels of the first zones to lie between respective minimum luminance levels and respective maximum luminance levels, until a first adjusted total power consumption value of the display does not exceed the current power budget.

The present disclosure provides the system and the method as described herein for managing graphical elements presented by a display under power-constrained conditions. The term "display" as used throughout the present disclosure relates to a visual output arrangement configured to present graphical elements to a user. In some implementations, the display enables simultaneous viewing of a surrounding real-world environment (e.g., transparent or combiner-based configurations). In other implementations, the display presents graphical elements without direct real-world overlay (e.g., opaque panels or wearable monitors). The display comprises the plurality of zones whose luminance is individually controllable. In one exemplary implementation, the display is implemented as a transparent display integrated into a windshield of a vehicle. In another exemplary implementation, the display is implemented as a non-transparent display paired with an optical combiner to produce a visual overlay superimposed onto a view of a real-world environment. In other implementations, the display may operate without a direct real-world overlay, such as in handheld, wearable, or industrial contexts. A technical benefit provided by use of the display is that visual information, such as the visual information associated with the visual overlay, is made available without obstructing visibility of the real-world environment.

The term "zone" as used throughout the present disclosure relates to an individually controllable region within the display. In an exemplary implementation, the display includes a matrix of zones, with each zone implemented as an M×N array of light-emitting elements. In another implementation, shapes of the zones vary across the display to satisfy projection geometry and optical layout constraints. In one example, the zones are shaped as polygonal or curved forms. Further, each zone is driven independently at the luminance level determined by the graphical elements assigned to the respective zone. A technical benefit provided by structuring the display into independently controllable zones is that zone-wise power allocation enables granular modulation of the luminance levels, reduced thermal hotspots, enhanced display component reliability, and prolonged operating life under constrained power budgets. Further technical benefits include improved pixel utilization, localized load balancing, reduced material fatigue, and prevention of over-illumination in inactive display areas.

The system identifies the plurality of graphical elements to be presented in a sequence of images. The term "sequence of images" as used throughout the present disclosure relates to successive images presented by the display to form a continuous visual output. The identification of graphical elements, determination of importance levels, and assignment of display zones need not be repeated for each image in the sequence of images, provided that the user's viewing geometry and graphical content displayed to the user remain unchanged. A technical benefit of avoiding the repetition is that computation of display pipeline is reduced, allowing for efficient resource allocation in real-time embedded systems. A further technical benefit provides is in enabling of anticipation of upcoming content and supports preprocessing tasks such as luminance planning, spatial allocation, and rendering resource scheduling.

The at least one processor determines a corresponding importance level for each graphical element. The term "importance level" as used throughout the present disclosure relates to a level indicating a relative priority of presentation for a graphical element. The importance level is either classified, for example, as critical, high, or normal, or assigned as a continuous numerical value compared against predefined thresholds.

The importance level is determined based on preconfigured rules, situational context, or real-time user interaction data. For example, a graphical element corresponding to a collision warning is assigned a critical importance level. Further, a speed indicator receives a high importance level. Moreover, a weather icon is classified as normal. The importance level is elevated dynamically based on user gaze, for example, as determined by a tracker. A technical benefit provided by use of importance levels is that the display allocates processing and power resources preferentially to critical graphical elements, while selectively dimming or disabling lower importance elements to maintain safe and effective user focus. The use of importance levels also enables introduction of a semantic content hierarchy that supports perceptual clarity and prioritised luminance resource assignment.

The system determines a corresponding set of zones within the display to be used to present each graphical element. The determination enables spatially confined rendering, where each graphical element is displayed only in required physical areas of the display. For example, a speed indicator is assigned to a corner zone, whereas a large warning icon spans multiple central zones. A technical benefit of assignment zones is that graphical elements are rendered efficiently, minimising overdraw, avoiding redundancy in overlapping areas, and improving pixel utilization.

A further technical benefit provided is in precision-targeted zone activation and avoiding resource conflicts between graphical elements sharing the same region.

For each zone, the system determines the minimum luminance level and the maximum luminance level based on the graphical elements assigned to the zone and their respective importance levels. The term "minimum luminance level" as used throughout the present disclosure relates to the lowest luminance required to preserve visibility of assigned graphical elements under given ambient lighting conditions. The term "maximum luminance level" relates to the highest luminance that can be used within power or thermal limits. For example, for critical graphical elements, the minimum luminance level corresponds to full brightness, while for lower priority elements, the minimum luminance is zero, such that the lower priority elements are disabled. Further, zones that are unassigned are configured such that their minimum and maximum luminance levels are identical, effectively deactivating them. A technical benefit provided by determining per-zone luminance limits is that brightness and visual contrast are optimized with respect to content significance, thereby reducing eye strain and avoiding unnecessary brightness in peripheral or inactive regions. Additional technical benefits include perceptual contrast management, mitigation of glare, and user comfort during extended operation.

The system estimates the minimum power consumption value and the maximum power consumption value for each zone. The term "minimum power consumption value" as used throughout the present disclosure relates to the estimated power drawn by a zone operating at its minimum luminance level. The term "maximum power consumption value" relates to the estimated power drawn by a zone operating at its maximum luminance level. The minimum and maximum power consumption values are derived using models, look-up tables, or hardware-specific mappings between luminance and energy consumption. A technical benefit of per-zone power estimation is that localized energy budgeting becomes possible, enabling predictive power management and balancing thermal load distribution across the display. The per-zone granularity supports intelligent thermal regulation, localized brightness planning, and accurate forecasting of power draw under dynamic content presentation.

Moreover, to evaluate overall display demand, the system calculates the maximum total power consumption value by summing the maximum power consumption values of all zones. The term "maximum total power consumption value" as used throughout the present disclosure relates to the aggregated peak demand if all zones operate at their respective maximum luminance levels. The system compares the maximum total power consumption value against the current power budget. The term "current power budget" as used throughout the present disclosure relates to a real-time limit on display power, enforced by vehicle or device-level energy policies, such as a fixed ceiling of 40 watts in an automotive configuration. A technical benefit provided by pre-emptively calculating and comparing total display demand is that the system avoids power overruns, maintains predictable behaviour under energy constraints, and aligns with broader energy governance systems. The comparison also supports proactive capping strategies, avoids unplanned shutdowns, and enables coordination with global power management interfaces.

When it is determined that the maximum total power consumption value exceeds the current power budget, the system identifies first zones corresponding to graphical elements having the lowest importance level.

Further, luminance levels of the identified first zones are then adjusted downward within their permitted minimum and maximum ranges. After each such adjustment, an updated total power consumption value is estimated. The iterative reduction in the luminance values continues until the adjusted power consumption value does not exceed the current power budget. A technical benefit provided by the iterative adjustment process is that the display continues presenting high-priority content under limited power availability, while smoothly degrading non-essential content to conserve energy. The power balancing operation ensures smooth visual transitions, avoids perceptual flicker, and enables uninterrupted operation in constrained scenarios.

In one exemplary implementation, the system is applied in windshield-based displays for vehicles, where the zone-wise luminance control supports visibility of essential information, such as collision alerts and speed indicators, during power-limited scenarios. In another exemplary implementation, the system is integrated into helmet-mounted or visor-based displays in aerospace and defence applications, where mission relevance determines graphical priority. In a further implementation, the system is used in wearable augmented reality glasses, where power constraints are strict and graphical overlays must be managed efficiently.

In yet another implementation, warehouse or industrial display systems apply the system to prioritize safety instructions or task indicators during battery-constrained operations. In an additional implementation, the system is used in maritime or heavy-vehicle environments where unpredictable ambient conditions and mechanical vibration require robust and stable power-aware display behaviour. A technical benefit provided by the system across implementations is that zone-wise, content-aware luminance adjustment enables seamless visual continuity, maximized utility of available power, minimized thermal load, and sustained operation of critical functions without compromising user safety or perceptual effectiveness.

The present disclosure also provides the method for managing graphical elements presented by the display under power constraints. The method comprises calculating the maximum total power consumption value for the display and comparing the maximum total power consumption value to the current power budget that is dynamically informed by vehicle power management data. The method further comprises identifying zones associated with graphical elements having lowest importance levels and adjusting luminance levels of the identified zones within allowable ranges so that power usage is reduced while presentation of critical content is maintained. A technical benefit provided by the method is that graphical information critical for driving safety or situational awareness remains continuously visible under varying vehicle power conditions, while energy expenditure is minimised to extend operational runtime or preserve battery reserves. In one real-world implementation in an automotive display system, the method is used to maintain high-visibility collision warnings and speed indicators under low battery conditions, wherein non-critical interface elements such as decorative graphics or ambient indicators are dimmed or disabled to conserve power.

Optionally, the at least one processor is configured to:

when it is determined that the maximum total power consumption value exceeds the current power budget,
- determine whether the first adjusted total power consumption value still exceeds the current power budget, after adjusting the luminance levels of the first zones; and
- when it is determined that the first adjusted total power consumption value still exceeds the current power budget,
  - identify second zones that correspond to at least one graphical element whose importance level is higher than the lowest importance level and lower than a highest importance level; and
  - adjust luminance levels of the second zones to lie between respective minimum luminance levels and respective maximum luminance levels, until a second adjusted total power consumption value of the display does not exceed the current power budget.

After performing initial adjustments, such as adjusting luminance levels of zones corresponding to graphical elements having the lowest importance levels, the at least one processor evaluates whether the adjusted total power consumption remains above the permitted budget. If the adjusted total power consumption remains above the permitted budget, the at least one processor identifies zones associated with graphical elements that have importance levels higher than the lowest importance level but lower than the highest importance level. The at least one processor reduces luminance levels of the identified zones within their allowed ranges. The adjusting of the luminance levels of zones associated with intermediate importance levels enables the display to maintain visibility of graphical elements having the highest importance levels while reducing power consumption from graphical elements of intermediate importance levels. A technical benefit provided by adjusting luminance levels of zones associated with intermediate importance levels is that the display continues to prioritise graphical elements necessary for operational safety under severe power limitations, while minimising overall power usage to comply with the current power budget.

Optionally, the at least one processor is configured to:

when it is determined that the first adjusted total power consumption value still exceeds the current power budget,
- determine whether the second adjusted total power consumption value still exceeds the current power budget, after adjusting the luminance levels of the second zones; and
- when it is determined that the second adjusted total power consumption value still exceeds the current power budget, perform at least one of:
  - reducing a resolution of the sequence of images;
  - reducing a frame rate at which the sequence of images is displayed;
  - reducing a sampling frequency of a tracker of the system;
  - reducing a frame rate at which real-world images are captured by at least one real-world-facing camera of the system.

After performing adjustments to luminance levels of zones corresponding to graphical elements having the lowest and intermediate importance levels, the at least one processor evaluates whether the second adjusted total power consumption value remains above the permitted budget. If the second adjusted total power consumption value remains above the permitted budget, the at least one processor performs at least one operation to reduce system power consumption. Such operations include reducing the resolution of the sequence of images, reducing the frame rate at which the sequence of images is displayed, reducing the sampling frequency of the tracker of the system, or reducing the frame rate at which real-world images are captured by at least one real-world-facing camera of the system. The reducing of rendering parameters and processing frequencies enables the display to decrease total system power consumption beyond display luminance adjustments. A technical benefit provided by reducing resolution, display frame rate, tracker sampling frequency, or real-world image capture frame rate is that the display preserves presentation of graphical elements necessary for operational safety under extreme power constraints while ensuring that system operation continues without complete shutdown.

Optionally, a size of a single zone is larger than a size of a single pixel of the display, wherein the at least one processor is configured to: when it is determined that the maximum total power consumption value exceeds the current power budget,
- identify at least one graphical element from among the plurality of graphical elements that is not constrained to a fixed position in the sequence of images; and
- relocate the at least one graphical element to a position proximate to at least one other graphical element from among the plurality of graphical elements, wherein at least one other zone is used to present both the at least one graphical element and the at least one other graphical element.

When the size of the single zone is larger than the size of the single pixel of the display and the maximum total power consumption value exceeds the current power budget, the at least one processor identifies the at least one graphical element that is not constrained to the fixed position in the sequence of images. The at least one processor relocates the at least one graphical element to a position proximate to the at least one other graphical element so that the at least one other zone is used to present both the at least one graphical element and the at least one other graphical element. The relocating of the at least one graphical element to share the at least one other zone with the at least one other graphical element enables the display to reduce a total number of zones activated. A technical benefit provided by relocating the at least one graphical element to share the at least one other zone is that the display reduces power consumption while maintaining presentation of required graphical elements within the display.

Optionally, when relocating, the at least one processor is configured to relocate a plurality of graphical elements to be presented within a predefined portion of a view frustum of the display.

When the at least one processor relocates graphical elements due to power constraints, the at least one processor relocates the plurality of graphical elements so that presentation occurs within the predefined portion of the view frustum of the display. The term "view frustum" as used throughout the present disclosure relates to a volumetric region of space visible to the user through the display, bounded by the display geometry and optical projection characteristics. The term "predefined portion of the view frustum" as used throughout the present disclosure relates to an area designated for presenting graphical elements under reduced power conditions. The relocation to the predefined portion results in the display presenting graphical elements in a limited area instead of across the full view frustum. The presenting of graphical elements within the predefined portion enables the display to continue displaying required graphical elements even under severe power or thermal constraints. A technical benefit provided by presenting graphical elements within the predefined portion of the view frustum is that the display reduces power consumption while maintaining presentation of essential graphical elements necessary for user safety and situational awareness.

Optionally, the system further comprises a tracker and at least one real-world-facing camera, wherein the display is a heads-up display, and wherein the at least one processor is configured to:

- when it is determined that the maximum total power consumption value exceeds the current power budget,
  - determine relative positions of eyes of at least one user with respect to an image plane of the heads-up display, using the tracker;
  - capture, using the at least one real-world-facing camera, at least one real-world image of a real-world environment whose real-world light field is being augmented by the heads-up display;
  - identify at least one portion of the image plane for which a luminance level of a corresponding portion of the real-world light field as projected toward a given eye is lower than a predefined threshold luminance level, based on the at least one real-world image and a relative position of the given eye with respect to the image plane; and
  - relocate at least one graphical element to be presented via at least one other zone that corresponds to the at least one identified portion of the image plane.

The term "heads-up display" as used in the present disclosure relates to a type of display arrangement that presents graphical elements within a forward field of view of a user such that the graphical elements appear optically superimposed on, or integrated with, a real-world field of view. A heads-up display can be implemented as a transparent display embedded into a windshield, a visor, or a wearable optical combiner, or as a non-transparent display in combination with an optical element that reflects or projects the graphical elements into the user's line of sight. A technical benefit provided by the use of the heads-up display is that graphical information can be perceived simultaneously with the real-world environment without requiring the user to shift focus to a separate display device.

The term "image plane" as used throughout the present disclosure relates to an intended location in space where a graphical element is perceived. When the display is implemented as the heads-up display, the image plane corresponds to the apparent spatial surface perceived by the user through direct view or optical reflection, such that graphical elements appear superimposed on, or integrated with, the real-world field of view. The image plane can also be a light-emitting surface of the display in a case where the heads-up display is being directly viewed. Alternatively, the image plane can be an imaginary plane in a case where an optical combiner is employed to facilitate a reflected view. The image plane is selected as disclosed herein irrespective of an optical configuration of the system, including cases where a distorted image is displayed on a curved or non-curved display and reflected through a curved combiner, where an undistorted image is displayed on a non-curved display and reflected through a non-curved combiner, or where an image is displayed on the heads-up display and viewed directly without any optical combiner.

The at least one processor analyses real-world images captured by the at least one real-world-facing camera to detect areas within the image plane where background luminance is below the predefined threshold for the user's eye position. The at least one processor relocates graphical elements to such areas to improve visual clarity against darker backgrounds. The relocating of the graphical elements to darker background areas enables the heads-up display to achieve desired perceived brightness levels with reduced luminance output. A technical benefit provided by relocating the graphical elements to lower luminance background portions is that the heads-up display reduces power consumption while maintaining clear visibility of graphical elements necessary for user safety and operational awareness.

Optionally, the display is a heads-up display comprising an active optical device arranged on an optical path of a real-world light field of a real-world environment, wherein the at least one processor is configured to:

- when it is determined that the maximum total power consumption value exceeds the current power budget,
  - activate at least one portion of the active optical device to decrease a transmission of a part of the real-world light field passing therethrough toward a given eye of at least one user; and
  - relocate at least one graphical element to be presented via at least one other zone that corresponds to the at least one portion of the active optical device.

The term "active optical device" as used throughout the present disclosure relates to an optical element configured to modify a property of a real-world light field passing through the active optical device in a controllable manner. The active optical device can be arranged on an optical combiner or on a transparent display that is the heads-up display. When the maximum total power consumption value exceeds the current power budget, the at least one processor activates portions of the active optical device to decrease transmission of parts of the real-world light field toward eyes of the at least one user. The activating of the active optical device reduces the brightness of real-world backgrounds in specific areas where graphical elements are presented, thereby improving perceived contrast of graphical elements without increasing luminance output of the heads-up display. The at least one processor relocates graphical elements to zones that correspond to portions of the active optical device where transmission has been decreased to maximise this effect. A technical benefit provided by decreasing transmission using the active optical device and relocating graphical elements to such portions is that the heads-up display reduces overall power consumption required for presenting graphical elements while maintaining visibility against dimmed real-world backgrounds under power-constrained conditions.

Optionally, the at least one processor is configured to:

when it is determined that the maximum total power consumption value exceeds the current power budget, perform at least one of:

reducing a size of the at least one graphical element;

modifying at least one appearance parameter of the at least one graphical element.

The reducing of the size of the at least one graphical element enables the at least one graphical element to fit into the at least one other zone that is used to present both the at least one graphical element and the at least one other graphical element, or to fit into the at least one other zone that corresponds to the at least one identified portion of the image plane. Alternatively, the reducing of the size of the at least one graphical element enables the at least one graphical element to fit into the at least one other zone that corresponds to the at least one portion of the active optical device. In some implementations, the active optical device only partially covers the image plane. The modifying of the at least one appearance parameter of the at least one graphical element changes a visual characteristic, such as colour or opacity, and leads to power savings. A technical benefit provided by reducing the size or modifying the appearance parameter of the at least one graphical element is that the display reduces power consumption while maintaining presentation of graphical elements necessary for operational safety and situational awareness.

Optionally, the at least one processor is configured to:

when it is determined that the maximum total power consumption value exceeds the current power budget, determine when at least one first zone corresponds to both a first graphical element having a first importance level and a first portion of a second graphical element having a second importance level that is lower than the first importance level, and when at least one second zone corresponds to a second portion of the second graphical element only;

when it is determined that the at least one first zone corresponds to both the first graphical element and the first portion of the second graphical element, and the at least one second zone corresponds to the second portion of the second graphical element only, drive the at least one first zone at a first luminance level corresponding to the first importance level and the at least one second zone at a second luminance level corresponding to the second importance level; and adjust a rendered intensity of the first portion of the second graphical element in the sequence of images, to match an estimated perceived luminance of the first portion of the second graphical element with an estimated perceived luminance of the second portion of the second graphical element.

When the maximum total power consumption value exceeds the current power budget, the at least one processor determines whether a zone that presents both a graphical element having a higher importance level and a first portion of another graphical element having a lower importance level is also accompanied by another zone that presents the second portion of the graphical element having only the lower importance level. In this situation, the at least one processor drives the zone presenting both graphical elements at a luminance level corresponding to the higher importance level and drives the other zone at a luminance level corresponding to the lower importance level. The at least one processor adjusts a rendered intensity of the first portion of the graphical element having the lower importance level to match an estimated perceived luminance of the first portion with an estimated perceived luminance of the second portion. The adjusting of the rendered intensity compensates for a difference between the luminance levels of the zones so that the graphical element having the lower importance level appears in a visually uniform manner. A technical benefit provided by adjusting the rendered intensity is that the display avoids patchy or inconsistent appearances for graphical elements having lower importance levels when the graphical elements are displayed across zones driven at different luminance levels, while maintaining required brightness for graphical elements having higher importance levels under power constraints.

Optionally, the system further comprises a tracker, wherein the at least one processor is configured to:

determine gaze directions of eyes of at least one user, using the tracker;

identify a graphical element at which the at least one user is looking, based on the gaze directions; and at least temporarily increase an importance level of the identified graphical element.

The at least one processor determines gaze directions of eyes of the at least one user using the tracker. The at least one processor identifies the graphical element at which the at least one user is looking based on the determined gaze directions. The at least one processor increases, at least temporarily, the importance level of the identified graphical element. The increasing of the importance level is maintained until the at least one user stops looking at the graphical element. The increasing of the importance level of the graphical element being viewed enables the display to prioritise graphical elements that are relevant to a current gaze direction of the user. A technical benefit provided by increasing the importance level of the graphical element being viewed is that the display allocates available power preferentially to graphical elements that are contextually significant to the user, thereby improving situational awareness and user responsiveness under power-constrained conditions.

Optionally, the system further comprises at least one real-world-facing camera, wherein the display is a heads-up display, and wherein the at least one processor is configured to:

capture, using the at least one real-world-facing camera, at least one real-world image of a real-world environment whose real-world light field is being augmented by the heads-up display;

identify a real-world object that lies on a predicted path of a vehicle in which the system is implemented; and at least temporarily increase an importance level of a graphical element that corresponds to the identified real-world object.

The system is implemented in a vehicle to manage graphical elements presented by the heads-up display under power constraints. The at least one processor uses the at least one real-world-facing camera to capture real-world images of the real-world environment whose real-world light field is being augmented by the heads-up display. The at least one processor identifies real-world objects that lie on a predicted path of the vehicle. The at least one processor increases, at least temporarily, an importance level of a graphical element that corresponds to the identified real-world object. The increasing of the importance level is maintained until the real-world object is no longer detected on the predicted path of the vehicle. The increasing of the importance level of the graphical element corresponding to the identified real-world object enables the heads-up display to prioritise graphical elements that are relevant to an immediate operational context of the vehicle. A technical benefit provided by increasing the importance level of the graphical element corresponding to the identified real-world object is that the heads-up display allocates available power preferentially to graphical elements representing real-world hazards or relevant objects, thereby improving user safety and situational awareness under power-constrained conditions.

Optionally, the at least one processor is configured to:

determine, for each graphical element, a corresponding bounding box within the display that is to be employed to present said graphical element; and generate a mapping between each graphical element and a corresponding set of zones within the display that overlap with its corresponding bounding box.

The at least one processor determines, for each graphical element, a corresponding bounding box within the display in display coordinates. The determining of the bounding box is performed by calculating the bounding box dimensions or by retrieving the bounding box from a data repository where it is pre-stored. For example, for a graphical element that is displayed via a fixed portion of the display, the corresponding bounding box is pre-calculated. The at least one processor generates a mapping between each graphical element and a corresponding set of zones within the display that overlap with the bounding box. The zones have the same size, whereas a size of the bounding box depends on a size of the graphical element that is to be presented within the bounding box. The zones are typically smaller in size than the bounding box. The generating of the mapping enables the at least one processor to associate graphical elements with relevant zones for luminance and power calculations efficiently. A technical benefit provided by generating the mapping between bounding boxes and zones is that the display optimises processing for power management decisions while maintaining accurate placement of graphical elements within the display.

The present disclosure further relates to the method as described above. Various embodiments and variants disclosed above with respect to the system described in the first aspect, apply mutatis mutandis to the method in the second aspect.

Optionally, the method further comprises:

when it is determined that the maximum total power consumption value exceeds the current power budget,
- determining whether the first adjusted total power consumption value still exceeds the current power budget, after adjusting the luminance levels of the first zones; and
- when it is determined that the first adjusted total power consumption value still exceeds the current power budget,
  - identifying second zones that correspond to at least one graphical element whose importance level is higher than the lowest importance level and lower than a highest importance level; and
  - adjusting luminance levels of the second zones to lie between respective minimum luminance levels and respective maximum luminance levels, until a second adjusted total power consumption value of the display does not exceed the current power budget.

When the first adjusted total power consumption value remains above the current power budget, the method includes identifying zones corresponding to graphical elements having importance levels higher than the lowest importance level but lower than the highest importance level, and adjusting luminance levels of these identified zones within their respective minimum and maximum luminance levels. The adjusting of luminance levels is performed until the second adjusted total power consumption value of the display does not exceed the current power budget. A technical benefit provided by adjusting luminance levels of zones associated with intermediate importance levels is that the method maintains visibility of graphical elements having the highest importance levels while systematically reducing power consumption to comply with power constraints.

Optionally, the method further comprises:

when it is determined that the first adjusted total power consumption value still exceeds the current power budget,
- determining whether the second adjusted total power consumption value still exceeds the current power budget, after adjusting the luminance levels of the second zones; and
- when it is determined that the second adjusted total power consumption value still exceeds the current power budget, performing at least one of:
  - reducing a resolution of the sequence of images;
  - reducing a frame rate at which the sequence of images is displayed;
  - reducing a sampling frequency of a tracker;
  - reducing a frame rate at which real-world images are captured by at least one real-world-facing camera.

When the second adjusted total power consumption value remains above the current power budget, the method includes performing at least one operation to reduce system power consumption. Such operations include reducing the resolution of the sequence of images, reducing the frame rate at which the sequence of images is displayed, reducing the sampling frequency of the tracker, or reducing the frame rate at which real-world images are captured by the at least one real-world-facing camera. A technical benefit provided by performing these operations is that the method enables the display to continue presenting essential graphical elements under extreme power constraints while minimising overall system power usage to prevent display shutdown.

Optionally, in the method, a size of a single zone is larger than a size of a single pixel of the display, the method further comprising:

when it is determined that the maximum total power consumption value exceeds the current power budget,
- identifying at least one graphical element from among the plurality of graphical elements that is not constrained to a fixed position in the sequence of images; and
- relocating the at least one graphical element to a position proximate to at least one other graphical element from among the plurality of graphical elements, wherein at least one other zone is used to present both the at least one graphical element and the at least one other graphical element.

When the maximum total power consumption value exceeds the current power budget, the method includes identifying the at least one graphical element from among the plurality of graphical elements that is not constrained to the fixed position in the sequence of images. The method further comprises relocating the at least one graphical element to a position proximate to the at least one other graphical element so that the at least one other zone is used to present both the at least one graphical element and the at least one other graphical element. A technical benefit provided by relocating the at least one graphical element to share the at least one other zone with the at least one other graphical element is that the method reduces power consumption of the display while maintaining presentation of required graphical elements under power-constrained conditions.

Optionally, the relocating comprises relocating a plurality of graphical elements to be presented within a predefined portion of a view frustum of the display.

The relocating to the predefined portion of the view frustum reduces the number of zones activated across the entire view frustum. The presenting of the plurality of graphical elements within the predefined portion enables the display to operate with a reduced field-of-view under power-constrained conditions. A technical benefit provided by relocating the plurality of graphical elements to the predefined portion of the view frustum is that the method reduces power consumption while maintaining presentation of graphical elements necessary for operational safety and situational awareness within a minimal visual area.

Optionally, wherein the display is a heads-up display, the method further comprises:

when it is determined that the maximum total power consumption value exceeds the current power budget, determining relative positions of eyes of at least one user with respect to an image plane of the heads-up display, using a tracker;

capturing, using at least one real-world-facing camera, at least one real-world image of a real-world environment whose real-world light field is being augmented by the heads-up display;

identifying at least one portion of the image plane for which a luminance level of a corresponding portion of the real-world light field as projected toward a given eye is lower than a predefined threshold luminance level, based on the at least one real-world image and a relative position of the given eye with respect to the image plane; and relocating at least one graphical element to be presented via at least one other zone that corresponds to the at least one identified portion of the image plane.

When the maximum total power consumption value exceeds the current power budget, the method includes using the tracker to determine where the eyes of the at least one user are located relative to the image plane of the heads-up display. The method includes capturing real-world images using the at least one real-world-facing camera to obtain visual data of the real-world environment whose real-world light field is being augmented by the heads-up display. The method involves identifying portions of the image plane where luminance levels of the corresponding portions of the real-world light field are lower than a predefined threshold luminance level, taking into account the position of the eyes of the user. The method further comprises relocating the at least one graphical element to zones corresponding to the identified portions of the image plane. In one implementation in which the display is the heads-up display, the method comprises projecting graphical elements onto an image plane perceived within the forward field of view of the user, such that the graphical elements appear optically superimposed on the real-world field of view through a windshield or an optical combiner. A technical benefit provided by relocating the at least one graphical element to portions with lower background luminance is that the method reduces power consumption of the heads-up display while maintaining clear visibility of graphical elements necessary for operational safety and situational awareness.

Optionally, wherein the display is a heads-up display, the method further comprises:

when it is determined that the maximum total power consumption value exceeds the current power budget, activating at least one portion of an active optical device of the heads-up display to decrease a transmission of a part of the real-world light field passing therethrough toward a given eye of at least one user, wherein the active optical device is arranged on an optical path of a real-world light field of a real-world environment; and relocating at least one graphical element to be presented via at least one other zone that corresponds to the at least one portion of the active optical device.

The activating of the active optical device decreases transmission of parts of the real-world light field toward eyes of the at least one user, thereby reducing background brightness in areas where graphical elements are presented on the display implemented as the heads-up display. The method includes relocating the at least one graphical element to zones corresponding to the portions of the active optical device where transmission has been decreased. A technical benefit provided by decreasing transmission using the active optical device and relocating graphical elements to such portions is that the method enables the heads-up display to maintain visibility of graphical elements with reduced luminance output, thereby lowering power consumption under power-constrained conditions.

Optionally, the method further comprises:

when it is determined that the maximum total power consumption value exceeds the current power budget, perform at least one of:

reducing a size of the at least one graphical element;

modifying at least one appearance parameter of the at least one graphical element.

The reducing of the size of the at least one graphical element enables the graphical element to fit into zones that may be shared with other graphical elements or to fit into zones having limited available luminance capacity. The modifying of the appearance parameter changes a visual characteristic, such as colour or opacity, to reduce power consumption. A technical benefit provided by reducing the size or modifying the appearance parameter of the at least one graphical element is that the method decreases power consumption of the display while maintaining presentation of graphical elements necessary for operational safety and situational awareness.

Optionally, the method further comprises:

when it is determined that the maximum total power consumption value exceeds the current power budget, determining when at least one first zone corresponds to both a first graphical element having a first importance level and a first portion of a second graphical element having a second importance level that is lower than the first importance level, and when at least one second zone corresponds to a second portion of the second graphical element only;

when it is determined that the at least one first zone corresponds to both the first graphical element and the first portion of the second graphical element, and the at least one second zone corresponds to the second portion of the second graphical element only, driving the at least one first zone at a first luminance level corresponding to the first importance level and the at least one second zone at a second luminance level corresponding to the second importance level; and adjusting a rendered intensity of the first portion of the second graphical element in the sequence of images, to match an estimated perceived luminance of the first portion of the second graphical element with an estimated perceived luminance of the second portion of the second graphical element.

The determining of luminance driving conditions for zones that present multiple graphical elements with differing importance levels under power-constrained conditions involves identifying where zones that present graphical elements having higher importance levels also present portions of graphical elements having lower importance levels. The adjusting of a rendered intensity of the first portion of the graphical element having the lower importance level is performed so that an estimated perceived luminance of the first portion matches an estimated perceived luminance of the second portion presented in another zone driven at a lower luminance level. The adjusting of the rendered intensity compensates for differences in luminance levels between zones, resulting in the graphical element having the lower importance level appearing in a visually uniform manner. A technical benefit provided by adjusting the rendered intensity in this manner is that the method avoids patchy or inconsistent appearances of graphical elements having lower importance levels across zones with differing luminance levels, while maintaining visibility of graphical elements having higher importance levels under power constraints.

Optionally, the method further comprises:

determining gaze directions of eyes of at least one user, using a tracker;

identifying a graphical element at which the at least one user is looking, based on the gaze directions; and at least temporarily increasing an importance level of the identified graphical element.

The method comprises monitoring gaze directions to determine which graphical elements are being actively viewed by the at least one user. The increasing of the importance level of the graphical element that the at least one user is looking at enables prioritisation of graphical elements aligned with the gaze direction of the user. A technical benefit provided by increasing the importance level of the graphical element being viewed is that the method allocates available power to graphical elements that are contextually relevant to the user, thereby improving situational awareness and user responsiveness under power-constrained conditions.

Optionally, the method further comprises:

capturing, using at least one real-world-facing camera, at least one real-world image of a real-world environment whose real-world light field is being augmented by the heads-up display;

identifying a real-world object that lies on a predicted path of a vehicle in which the heads-up display is implemented; and at least temporarily increasing an importance level of a graphical element that corresponds to the identified real-world object.

The method includes analysing real-world images to identify objects located on a predicted path of the vehicle in which the heads-up display is implemented. The increasing of the importance level of the graphical element corresponding to the identified real-world object enables prioritisation of graphical elements representing objects relevant to immediate vehicle operation. A technical benefit provided by increasing the importance level of the graphical element corresponding to the identified real-world object is that the method allocates available power to graphical elements representing potential hazards or critical objects, thereby improving user safety and situational awareness under power-constrained conditions.

DETAILED DESCRIPTION OF THE DRAWINGS

FIG. 1 illustrates an exemplary implementation of a system 100, in accordance with an embodiment of the present disclosure. The system 100 comprises a display 102. The display 102 is shown integrated into a windshield of a vehicle 104, where the display 102 overlays graphical elements onto a view of a real-world environment to provide information to a user 106 without obstructing visibility. The display 102 can be implemented as a heads-up display integrated into the windshield of the vehicle 104. The display 102 includes a plurality of zones whose luminance is individually controllable. The zones are implemented within the display 102 to allow presentation of graphical elements with different luminance levels in different regions.

The system 100 further comprises at least one processor 108 connected to the display 102. The at least one processor 108 is configured to identify a plurality of graphical elements to be presented in a sequence of images, determine an importance level for each graphical element, determine a set of zones within the display 102 to be used to present each graphical element, and determine minimum luminance levels and maximum luminance levels for each zone based on the graphical elements assigned to the zone and their respective importance levels. The at least one processor 108 is also configured to estimate minimum power consumption values and maximum power consumption values for each zone based on the respective luminance levels, calculate a maximum total power consumption value for the display 102 by summing maximum power consumption values across all zones, and determine whether the maximum total power consumption value exceeds a current power budget of the display 102. When the maximum total power consumption value exceeds the current power budget, the at least one processor 108 identifies first zones that correspond to graphical elements having the lowest importance level and adjusts luminance levels of the first zones within their allowable minimum and maximum luminance levels to reduce power consumption.

The system 100 additionally comprises a tracker 110 connected to the processor 108. The tracker 110 detects gaze directions or head positions of the user 106 relative to the display 102. The tracker 110 enables determination of where the user 106 is looking at the display 102 to support gaze-based prioritisation of graphical elements. A real-world-facing camera 112 is also shown connected to the processor 108. The real-world-facing camera 112 captures images of the real-world environment that is being augmented by graphical elements presented on the display 102. The captured real-world images are used by the at least one processor 108 to determine background luminance levels, detect real-world objects, and support relocation of graphical elements for optimal presentation under power constraints.

It will be understood that FIG. 1 provides a schematic illustration of the system 100 to support explanation of operation of the system 100. Additional components, such as further optical elements, transparent display support structures, or processing units may also be part of the system 100 depending on the implementation. The display 102, the at least one processor 108, the tracker 110, and the real-world-facing camera 112 are shown schematically for clarity, and their arrangement may differ in other implementations based on installation constraints, vehicle architecture, or integration with other sensor systems.

Figure 2:
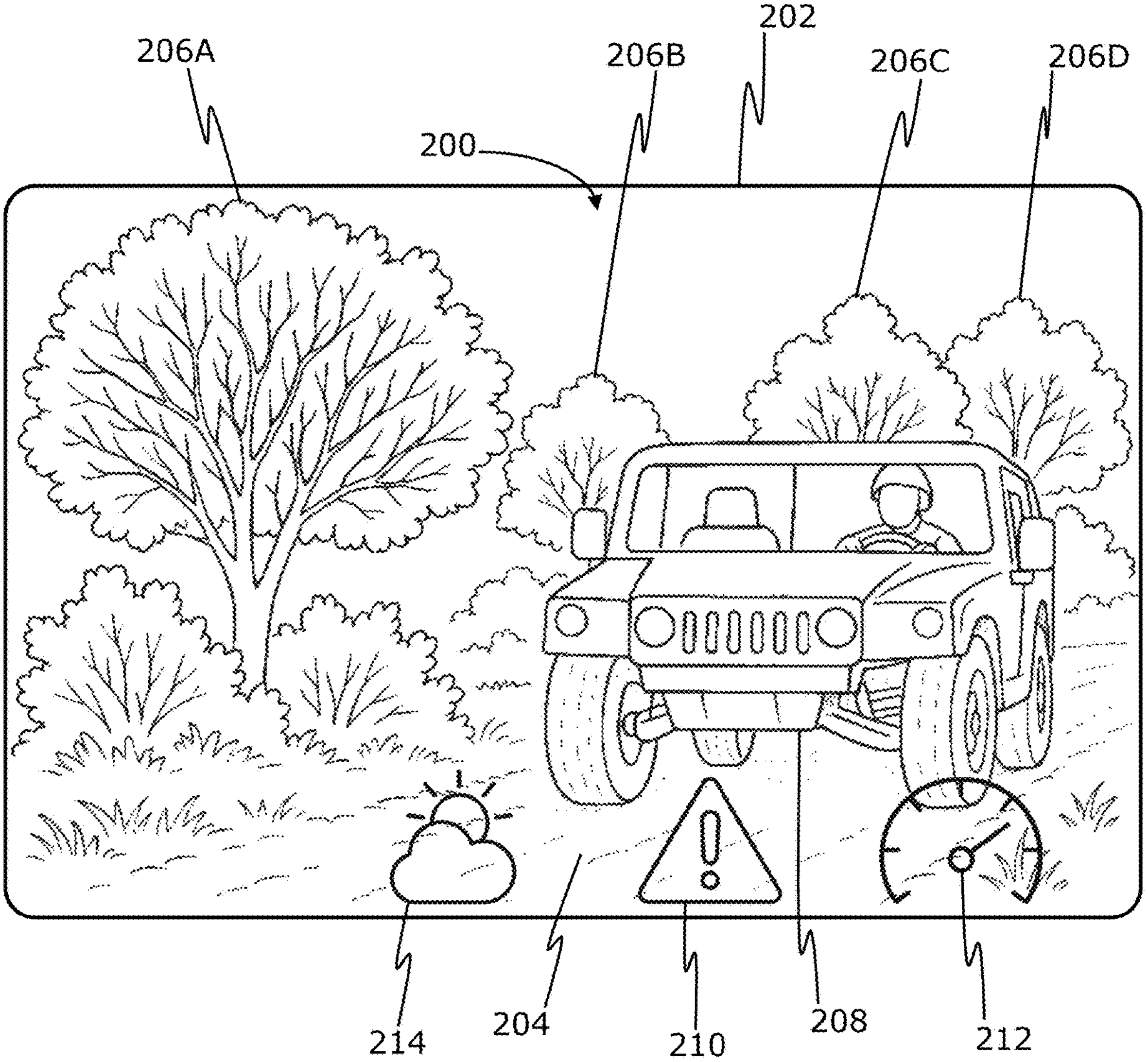
FIG. 2 illustrates an exemplary viewing scenario as seen from a display of a present vehicle (such as the display of the vehicle shown in FIG. 1), in accordance with an embodiment of the present disclosure.

FIG. 2 illustrates an exemplary viewing scenario 200 as seen from a display 202 of a present vehicle (such as the display 102 of the vehicle 104 shown in FIG. 1), in accordance with an embodiment of the present disclosure. A vehicle (not shown) within which the display 202 is implemented, is referred to as "present vehicle" throughout the remainder of the present disclosure. The viewing scenario 200 shows a predicted path 204 of a road along which the present vehicle is travelling within a real-world environment comprising trees 206A, 206B, 206C and 206D positioned alongside the road.

On predicted path 204 of the road, another vehicle 208 is shown being driven ahead of the present vehicle in a manner such that a potential collision could occur if the relative speeds and positions remain unchanged. A graphical element representing a collision warning indicator 210 is presented by the display 202. The collision warning indicator 210 is shown overlaid near the centre of the display, aligned with the predicted collision path between the present vehicle and the vehicle 208.

Further graphical elements are shown within the viewing scenario 200, including a digital speedometer 212 presented to the right of the display area to indicate current vehicle speed to the user, and a weather icon 214 presented at the left of the collision warning indicator 210 to indicate current weather conditions. The graphical elements 210, 212, and 214 are displayed with respective luminance levels calculated based on their importance levels, positions within the display 202, and background luminance conditions derived from the real-world environment comprising the road and trees 206A, 206B, 206C and 206D. The display 202 thus overlays critical, high, and normal importance graphical elements in spatially distributed regions of the display to provide situational awareness to the user while maintaining visibility of the real-world environment.

It will be understood that FIG. 2 provides a schematic illustration of the viewing scenario 200 to support explanation of the operation and visual output of the display 202. Additional graphical elements, road markers, environmental objects, or interface components may also be presented within the display 202 depending on operational requirements and implementation configurations.

Figure 3:
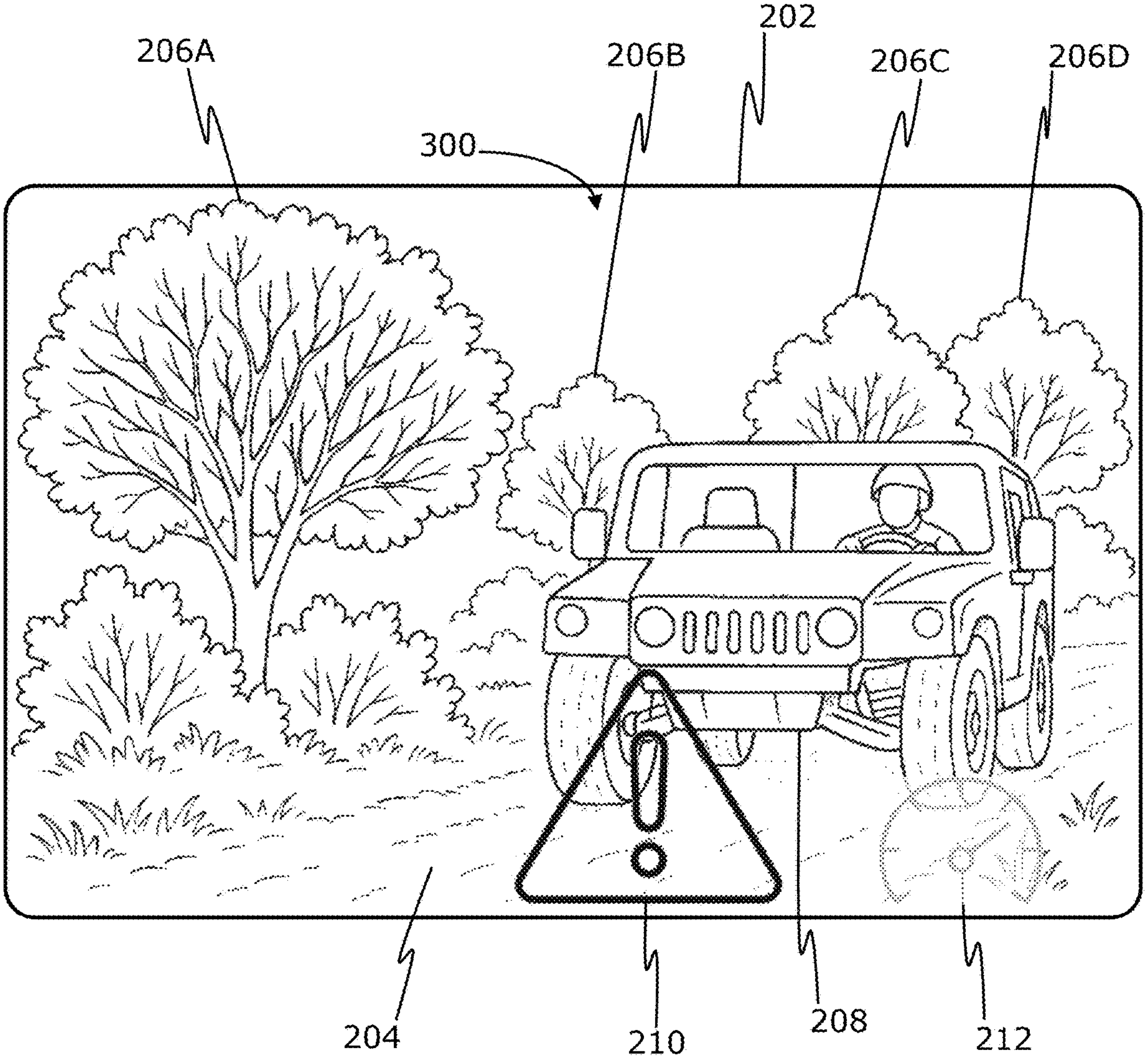
FIG. 3 illustrates a viewing scenario, which is a continuation of the viewing scenario shown in FIG. 2, in accordance with an embodiment of the present disclosure.

FIG. 3 illustrates a viewing scenario 300, which is a continuation of the viewing scenario 200 shown in FIG. 2, in accordance with an embodiment of the present disclosure. The viewing scenario 300 depicts adjustments made to graphical elements presented by the display 202 of the present vehicle under power-constrained conditions based on their respective importance levels.

In the viewing scenario 300, the weather icon 214 as was shown in FIG. 2, has been deemed to have normal importance level and is therefore disabled to conserve power. Consequently, the weather icon 214 is not shown in FIG. 3. The weather icon 214 is no longer displayed within the display 202, thereby reducing power consumption associated with presenting a non-critical graphical element.

The digital speedometer 212, having an intermediate importance level, is retained within the display 202 but a luminance level thereof has been reduced. Thus, the digital speedometer 212 is shown to be dimmed. The dimming of the digital speedometer 212 enables continued presentation of vehicle speed information to the user while lowering power usage compared to full brightness operation.

The collision warning indicator 210, having a critical importance level, has been retained and emphasised within the display 202. The collision warning indicator 210 is presented at the centre of the display area and has been enlarged to increase visual prominence thereof. Additionally, the collision warning indicator 210 is displayed with a darker appearance to improve contrast and visibility against the background while reducing the required luminance output.

The viewing scenario 300 thus illustrates prioritisation of graphical elements based on importance levels, with critical graphical elements such as the collision warning indicator 210 being emphasised, intermediate importance graphical elements such as the digital speedometer 212 being dimmed, and normal importance graphical elements such as the weather icon 214 being disabled under power-constrained conditions.

It will be understood that FIG. 3 provides a schematic illustration of the viewing scenario 300 to support explanation of operation of the display 202 in managing graphical elements based on importance levels under power constraints. Additional graphical elements or interface configurations may be implemented depending on specific operational requirements and vehicle system integrations.

Figure 4:
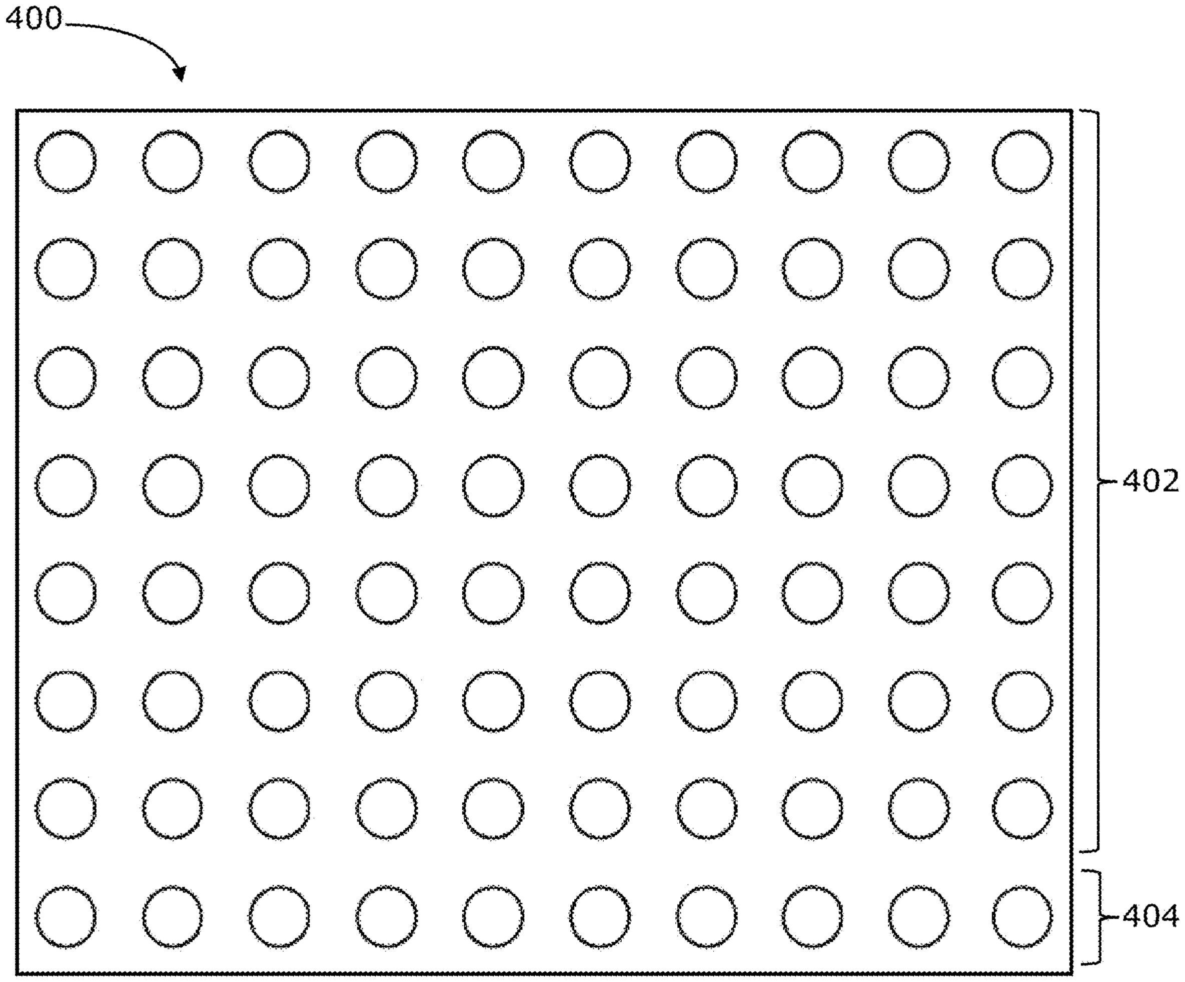
FIG. 4 illustrates an exemplary display, in accordance with an embodiment of the present disclosure.

FIG. 4 illustrates an exemplary display 400, in accordance with an embodiment of the present disclosure. The display 400 shows a relocation operation performed by the system (such as the system 100 shown in FIG. 1) under power-constrained conditions to reduce active zone usage.

The display 400 comprises an upper zone 402 and a lower zone 404. Initially, graphical elements are presented within the upper zone 402, requiring the upper zone 402 to be actively driven. To reduce total power consumption, the graphical elements are relocated from the upper zone 402 to the lower zone 404. As a result, both the relocated graphical elements and any pre-existing graphical elements assigned to the lower zone 404 are presented within the same zone.

The relocating of graphical elements from the upper zone 402 to the lower zone 404 reduces the total number of zones activated within the display 400. Consequently, the relocating of the graphical elements to share the lower zone 404 enables the display 400 to reduce overall power consumption while maintaining presentation of required graphical elements under power-constrained conditions.

It will be understood that FIG. 4 provides a schematic illustration of the display 400 to support explanation of graphical element relocation for zone sharing. Additional zones, graphical elements, or relocation operations may be implemented depending on display configuration, system logic, and power budget requirements.

Figure 5:
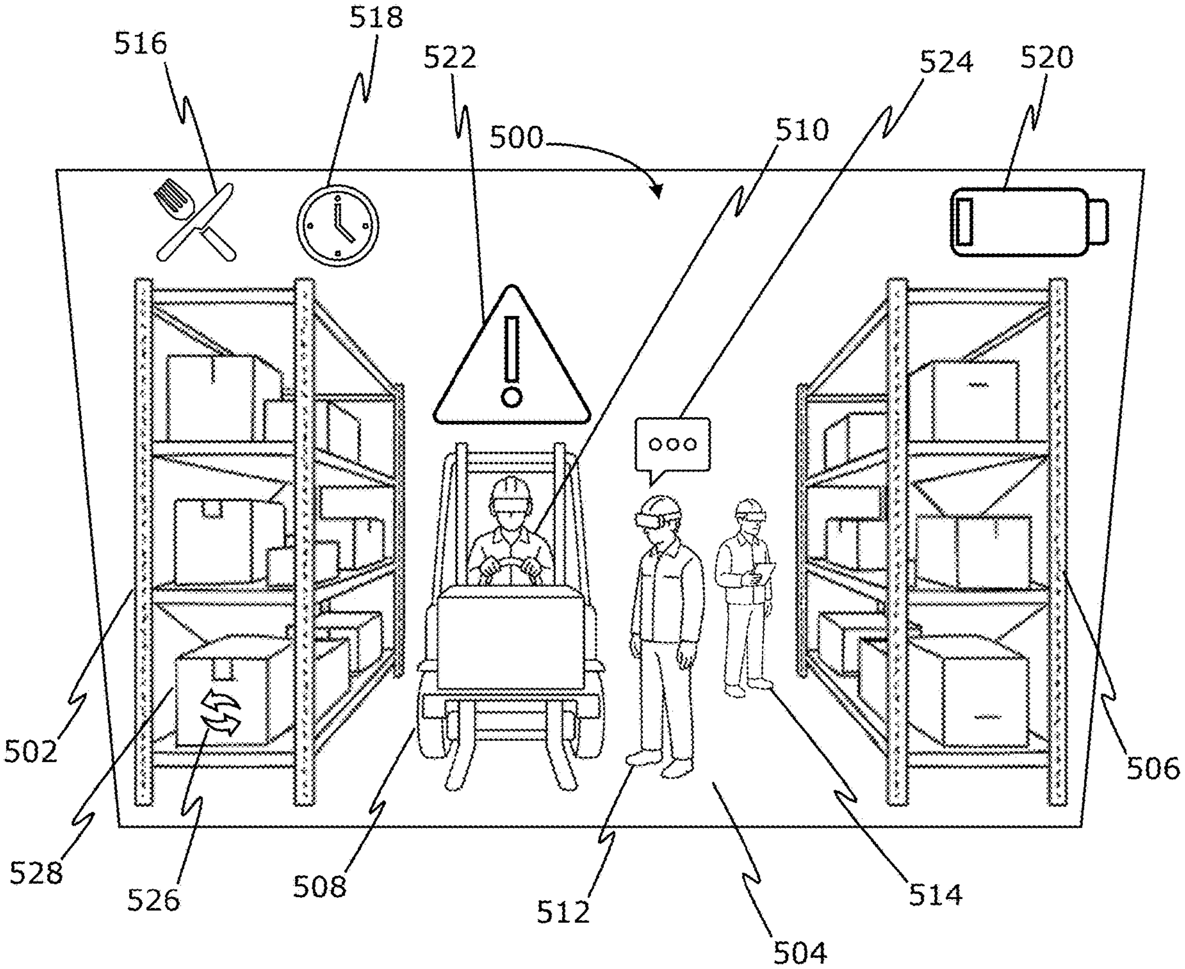
FIG. 5 illustrates a representative viewing scenario as perceived through a display, such as the display shown in FIG. 4, in accordance with an embodiment of the present disclosure.

FIG. 5 illustrates a representative viewing scenario 500 as perceived through a display, such as the display 400 shown in FIG. 4, in accordance with an embodiment of the present disclosure. The display is worn by an employee operating within a warehouse environment. The viewing scenario 500 is presented from a perspective of such an employee and shows multiple real-world objects and associated graphical elements rendered by the display.

The viewing scenario includes a rack 502 on a left side of a warehouse aisle 504 and another rack 506 on a right side of the aisle 504. Further, positioned within the aisle 504 is a forklift 508, which is operated by a forklift operator 510.

Another employee 512, such as a supervisor or shift manager, is shown standing adjacent to the forklift 508, while a yet another employee 514 is present further along the aisle 504.

The display also presents a plurality of graphical elements rendered overlaid onto the real-world environment. A graphical element 516 is shown at a top-left region of the display and represents a knife-and-fork icon, indicating an upcoming scheduled break or lunchtime. Moreover, adjacent to the graphical element 516 is shown another graphical element 518 in the form of a clock icon, providing a contextual time indicator in association with the upcoming scheduled break or lunchtime reminder. Yet another graphical element 520 is shown in a top-right region of the display and corresponds to a battery icon indicating that the display worn by the employee has low battery charge.

Additionally, positioned directly above the forklift 508 is a graphical element 522, which corresponds to a safety warning indicator visually associated with the forklift 508 to indicate an active danger zone or movement hazard. A further graphical element 524 is displayed above the employee 512 and corresponds to a message indicator, denoting that a communication or task instruction has been received from the employee 512. Still another graphical element 526 is displayed as overlaid on a package 528 located on the rack 502 on the left side of the aisle 504.

The graphical element 526 resembles a circular refresh icon with two opposing arrows and indicates that the associated package 526 is marked for repositioning, rearrangement, or inventory rotation.

Figure 6:
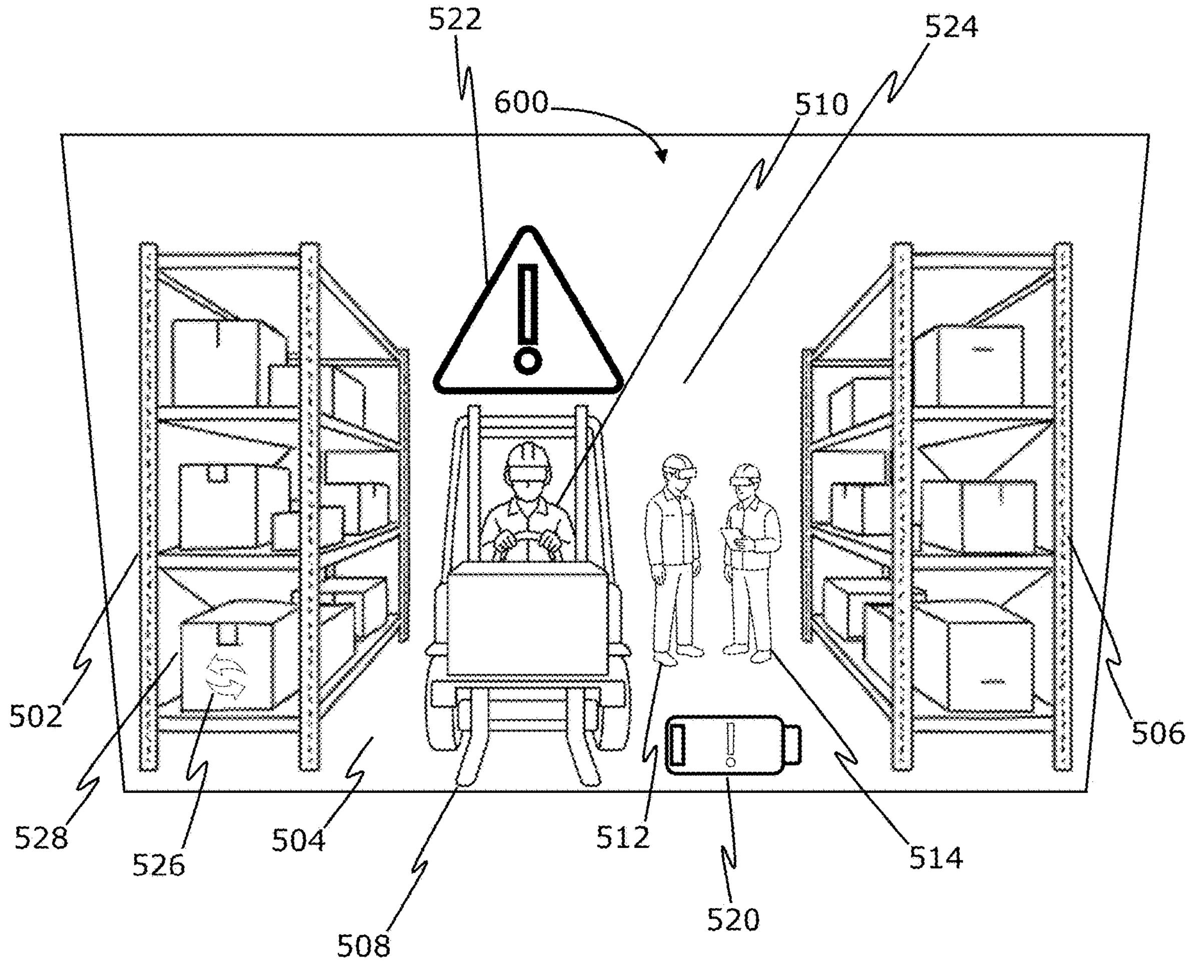
FIG. 6 illustrates a modified viewing scenario of the viewing scenario shown in FIG. 5, in accordance with an embodiment of the present disclosure.

FIG. 6 illustrates a modified viewing scenario 600 of the viewing scenario shown 500 in FIG. 5, in accordance with an embodiment of the present disclosure. The viewing scenario 600 corresponds to a subsequent scene of the viewing scenario 500 shown in FIG. 5, as perceived through the same display worn by the employee within the warehouse environment.

The viewing scenario 600 reflects dynamic updates made to graphical elements rendered by the display based on real-world changes and power-constrained conditions.

In the viewing scenario 600, the forklift 508 has moved forward within the aisle 504 and is now positioned in closer proximity to the employee wearing the display. As a result, the graphical element 522 representing the safety warning indicator is presented with increased visual prominence. The graphical element 522 is rendered using darker line segments and increased stroke width to enhance contrast and draw the attention of the employee to the proximity hazard associated with the forklift 508.

Moreover, due to an absence of immediate relevance, the graphical elements 516 and 518, which respectively represented the knife-and-fork icon and clock icon in FIG. 5, have been deactivated. Consequently, the graphical elements 516 and 518 are not shown in the viewing scenario 600, thereby reducing unnecessary luminance output and conserving power.

Additionally, the employee 512, who was earlier positioned near the forklift 508, is shown to have walked further up the aisle 504 and is now standing adjacent to the employee 514. The graphical element 524 representing the message indicator associated with the employee 512 has been deactivated, and is therefore not presented in the viewing scenario 600.

The graphical element 520 representing the battery indicator has been modified to reflect a critically low battery state. To reduce the number of simultaneously active upper zones within the display, the graphical element 520 has been relocated from the top-right region to a lower region of the display. The repositioning is consistent with the zone-sharing relocation operation illustrated with respect to the display 400 of FIG. 4. Further, an exclamation point is presented within the graphical element 520 to indicate the criticality of the battery state and prompt immediate user attention.

The graphical element 526 associated with the package 528 on the rack 502 remains presented in the viewing scenario 600 but is shown with reduced visual prominence. The graphical element 526 is dimmed to operate at a lower luminance level in view of the ongoing power-conservation strategy implemented by the system. The dimming of the graphical element 526 allows continued visual availability of the package instruction while contributing to overall energy savings.

Figure 7:
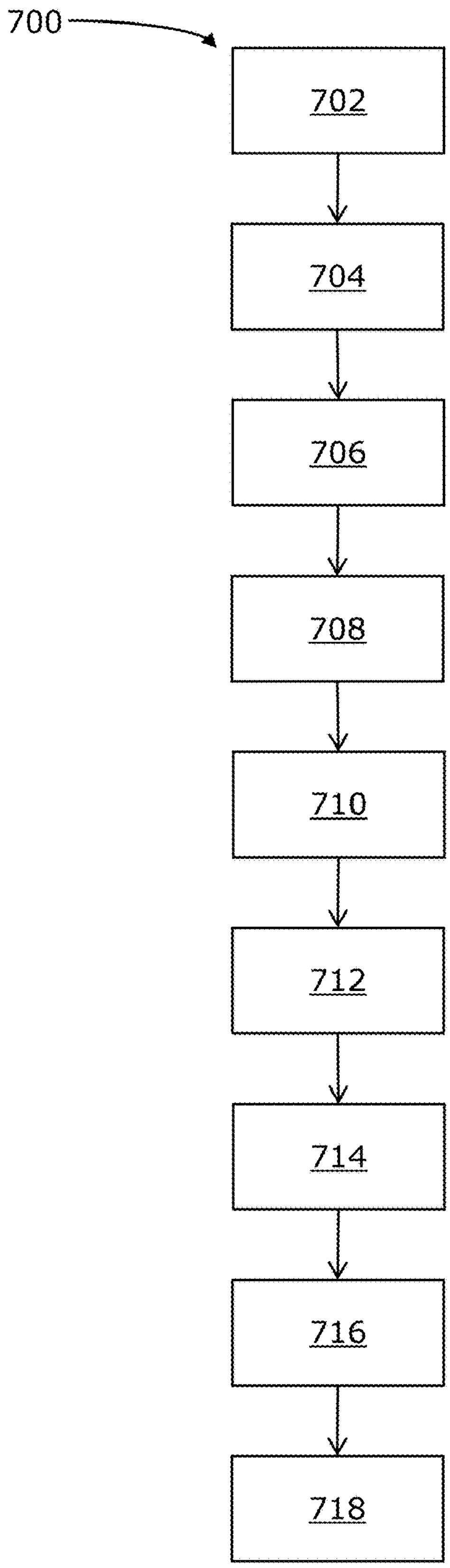
FIG. 7 shows steps of a method, in accordance with an embodiment of the present disclosure.

It will be understood that FIG. 6 provides a schematic illustration of the modified viewing scenario 600 to support explanation of runtime adaptation of the graphical elements by the system under real-world and power-constrained conditions. The relocation of the graphical element 520 from an upper region to the lower region of the display is shown for illustrative clarity only. It will be appreciated that other relocations between any two regions or sets of zones, for example, left to right, centre to edge, diagonally grouped, or clustered within a band reserved for reduced-power operation are also possible. Thus, the system performs not only upper-to-lower movement of the graphical elements but also relocates, dims, scales, activates, or deactivates the graphical elements across different zones of the display to conserve power while maintaining presentation of priority information. FIG. 7 shows steps of a method 700, in accordance with an embodiment of the present disclosure.

At step 702, a plurality of graphical elements to be presented in a sequence of images is identified.

At step 704, for each graphical element, a corresponding importance level is determined.

At step 706, for each graphical element, a corresponding set of zones within a display of a display that are to be used to present the graphical element is determined, wherein the display comprises a plurality of zones whose luminance is individually controllable.

At step 708, for each zone, a minimum luminance level and a maximum luminance level are determined, based on at least one graphical element to be presented by the zone, and an importance level of the at least one graphical element.

At step 710, for each zone, a minimum power consumption value and a maximum power consumption value are estimated, based on a respective minimum luminance level and a respective maximum luminance level.

At step 712, a maximum total power consumption value for the display is calculated by summing maximum power consumption values of the plurality of zones.

At step 714, it is determined whether the maximum total power consumption value exceeds a current power budget of the display.

At step 716, when it is determined that the maximum total power consumption value exceeds the current power budget, first zones that correspond to at least one graphical element having a lowest importance level are identified.

At step 718, luminance levels of the first zones are adjusted to lie between respective minimum luminance levels and respective maximum luminance levels, until a first adjusted total power consumption value of the display does not exceed the current power budget.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising:

a display comprising a plurality of zones whose luminance is individually controllable; and at least one processor configured to:

identify a plurality of graphical elements to be presented in a sequence of images;

for each graphical element of the plurality of graphical elements, determine a corresponding importance level;

for each graphical element of the plurality of graphical elements, determine a corresponding set of zones of the plurality of zones within the display that are to be used to present each graphical element;

for each zone of the corresponding set of zones, determine a minimum luminance level and a maximum luminance level, based on at least one graphical element of the plurality of graphical elements to be presented by each zone, and an importance level of the at least one graphical element;

for each zone of the corresponding set of zones, estimate a minimum power consumption value and a maximum power consumption value, based on a respective minimum luminance level and a respective maximum luminance level;

calculate a maximum total power consumption value for the display, by summing maximum power consumption values of the plurality of zones;

determine whether the maximum total power consumption value exceeds a current power budget of the display; and when it is determined that the maximum total power consumption value exceeds the current power budget, identify first zones of the plurality of zones that correspond to at least one graphical element having a lowest importance level of the plurality of graphical elements; and adjust luminance levels of the first zones to lie between respective minimum luminance levels and respective maximum luminance levels, until a first adjusted total power consumption value of the display does not exceed the current power budget;

determine when at least one first zone of the corresponding set of zones corresponds to both a first graphical element having a first importance level and a first portion of a second graphical element having a second importance level that is lower than the first importance level, and when at least one second zone corresponds to a second portion of the second graphical element only; and when it is determined that the at least one first zone corresponds to both the first graphical element and the first portion of the second graphical element, and the at least one second zone corresponds to the second portion of the second graphical element only, drive the at least one first zone at a first luminance level corresponding to the first importance level and the at least one second zone at a second luminance level corresponding to the second importance level; and adjust a rendered intensity of the first portion of the second graphical element in the sequence of images, to match an estimated perceived luminance of the first portion of the second graphical element with an estimated perceived luminance of the second portion of the second graphical element.

2. The system of claim 1, wherein the at least one processor is configured to:

when it is determined that the maximum total power consumption value exceeds the current power budget, determine whether the first adjusted total power consumption value still exceeds the current power budget, after adjusting the luminance levels of the first zones; and when it is determined that the first adjusted total power consumption value still exceeds the current power budget, identify second zones of the plurality of zones that correspond to at least one graphical element whose importance level is higher than the lowest importance level and lower than a highest importance level among the plurality of graphical elements; and adjust luminance levels of the second zones to lie between respective minimum luminance levels and respective maximum luminance levels, until a second adjusted total power consumption value of the display does not exceed the current power budget.

3. The system of claim 2, wherein the at least one processor is configured to:

when it is determined that the first adjusted total power consumption value still exceeds the current power budget, determine whether the second adjusted total power consumption value still exceeds the current power budget, after adjusting the luminance levels of the identified second zones; and when it is determined that the second adjusted total power consumption value still exceeds the current power budget, perform at least one of:

reducing a resolution of the sequence of images;

reducing a frame rate at which the sequence of images is displayed;

reducing a sampling frequency of a tracker of the system; or reducing a frame rate at which real-world images are captured by at least one real-world-facing camera of the system.

4. The system of claim 1, wherein a size of a single zone of the plurality of zones is larger than a size of a single pixel of the display, and wherein the at least one processor is configured to:

when it is determined that the maximum total power consumption value exceeds the current power budget, identify at least one graphical element from among the plurality of graphical elements that is not constrained to a fixed position in the sequence of images; and relocate the at least one graphical element to a position proximate to at least one other graphical element from Previously Presented among the plurality of graphical elements, wherein at least one other zone of the plurality of zones is used to present both the at least one graphical element and the at least one other graphical element.

5. The system of claim 4, wherein when relocating, the at least one processor is configured to relocate a plurality of Previously Presented graphical elements to be presented within a predefined portion of a view frustum of the display.

6. The system of claim 1, further comprising a tracker and at least one real-world-facing camera, wherein the display is a heads-up display, and wherein the at least one processor is configured to:

when it is determined that the maximum total power consumption value exceeds the current power budget, determine relative positions of eyes of at least one user with respect to an image plane of the heads-up display, using the tracker;

capture, using the at least one real-world-facing camera, at least one real-world image of a real-world environment whose real-world light field is being augmented by the heads-up display;

identify at least one portion of the image plane for which a luminance level of a corresponding portion of the real-world light field as projected toward a given eye is lower than a predefined threshold luminance level, based on the at least one real-world image and a relative position of the given eye with respect to the image plane; and relocate at least one graphical element to be presented via at least one other zone of the plurality of zones that corresponds to the at least one identified portion of the image plane.

7. The system of claim 1, wherein the display is a heads-up display comprising an active optical device arranged on an optical path of a real-world light field of a real-world environment, wherein the at least one processor is configured to:

when it is determined that the maximum total power consumption value exceeds the current power budget, activate at least one portion of the active optical device to decrease a transmission of a part of the real-world light field passing therethrough toward a given eye of at least one user; and relocate at least one graphical element to be presented via at least one other zone that corresponds to the at least one portion of the active optical device.

8. The system of claim 4, wherein the at least one processor is configured to:

when it is determined that the maximum total power consumption value exceeds the current power budget, perform at least one of:

reducing a size of the at least one graphical element; or modifying at least one appearance parameter of the at least one graphical element.

9. The system of claim 1, further comprising a tracker, wherein the at least one processor is configured to:

determine gaze directions of eyes of at least one user, using the tracker;

identify a graphical element at which the at least one user is looking, based on the gaze directions; and at least temporarily increase an importance level of the identified graphical element.

10. The system of claim 1, further comprising at least one real-world-facing camera, wherein the display is a heads-up display, and wherein the at least one processor is configured to:

capture, using the at least one real-world-facing camera, at least one real-world image of a real-world environment whose real-world light field is being augmented by the heads-up display;

identify a real-world object that lies on a predicted path of a vehicle in which the system is implemented; and at least temporarily increase an importance level of a graphical element that corresponds to the identified real-world object.

11. A method comprising:

identifying a plurality of graphical elements to be presented in a sequence of images;

for each graphical element of the plurality of graphical elements, determining a corresponding importance level;

for each graphical element, determining a corresponding set of zones within a display that are to be used to present each graphical element, wherein the display comprises a plurality of zones whose luminance is individually controllable;

for each zone of the plurality of zones, determining a minimum luminance level and a maximum luminance level, based on at least one graphical element of the plurality of graphical elements to be presented by each zone, and an importance level of the at least one graphical element;

for each zone, estimating a minimum power consumption value and a maximum power consumption value, based on a respective minimum luminance level and a respective maximum luminance level;

calculating a maximum total power consumption value for the display, by summing maximum power consumption values of the plurality of zones;

determining whether the maximum total power consumption value exceeds a current power budget of the display; and when it is determined that the maximum total power consumption value exceeds the current power budget, identifying first zones of the plurality of zones that correspond to at least one graphical element having a lowest importance level of the plurality of graphical elements; and adjusting luminance levels of the first zones to lie between respective minimum luminance levels and respective maximum luminance levels, until a first adjusted total power consumption value of the display does not exceed the current power budget;

determining when at least one first zone corresponds to both a first graphical element having a first importance level and a first portion of a second graphical element having a second importance level that is lower than the first importance level, and when at least one second zone corresponds to a second portion of the second graphical element only;

when it is determined that the at least one first zone corresponds to both the first graphical element and the first portion of the second graphical element, and the at least one second zone corresponds to the second portion of the second graphical element only, driving the at least one first zone at a first luminance level corresponding to the first importance level and the at least one second zone at a second luminance level corresponding to the second importance level; and adjusting, a rendered intensity of the first portion of the second graphical element in the sequence of images, to match an estimated perceived luminance of the first portion of the second graphical element with an estimated perceived luminance of the second portion of the second graphical element.

12. The method of claim 11, further comprising:

when it is determined that the maximum total power consumption value exceeds the current power budget, determining whether the first adjusted total power consumption value still exceeds the current power budget, after adjusting the luminance levels of the first zones; and when it is determined that the first adjusted total power consumption value still exceeds the current power budget, identifying second zones of the plurality of zones that correspond to at least one graphical element whose importance level is higher than the lowest importance level and lower than a highest importance level of the plurality of graphical elements; and adjusting luminance levels of the second zones to lie between respective minimum luminance levels and respective maximum luminance levels, until a second adjusted total power consumption value of the display does not exceed the current power budget.

13. The method of claim 11, wherein a size of a single zone of the plurality of zones is larger than a size of a single pixel of the display, the method further comprising:

when it is determined that the maximum total power consumption value exceeds the current power budget, identifying at least one graphical element from among the plurality of graphical elements that is not constrained to a fixed position in the sequence of images; and relocating the at least one graphical element to a position proximate to at least one other graphical element from among the plurality of graphical elements, wherein at least one other zone is used to present both the at least one graphical element and the at least one other graphical element.

14. The method of claim 11, wherein the display is a heads-up display, the method further comprising:

when it is determined that the maximum total power consumption value exceeds the current power budget, determining relative positions of eyes of at least one user with respect to an image plane of the heads-up display, using a tracker;

capturing, using at least one real-world-facing camera, at least one real-world image of a real-world environment whose real-world light field is being augmented by the heads-up display;

identifying at least one portion of the image plane for which a luminance level of a corresponding portion of the real-world light field as projected toward a given eye is lower than a predefined threshold luminance level, based on the at least one real-world image and a relative position of the given eye with respect to the image plane; and relocating at least one graphical element to be presented via at least one other zone that corresponds to the at least one identified portion of the image plane.

15. The method of claim 11, wherein the display is a heads-up display, the method further comprising:

when it is determined that the maximum total power consumption value exceeds the current power budget, activating at least one portion of an active optical device of the heads-up display to decrease a transmission of a part of the real-world light field passing therethrough toward a given eye of at least one user, wherein the active optical device is arranged on an optical path of a real-world light field of a real-world environment; and relocating at least one graphical element to be presented via at least one other zone that corresponds to the at least one portion of the active optical device.

* * * * *